(12) United States Patent
Rossmair et al.

(10) Patent No.: US 12,503,045 B2
(45) Date of Patent: Dec. 23, 2025

(54) VEHICLE PANE WITH A LIGHTING DEVICE

(71) Applicant: Webasto SE, Stockdorf (DE)

(72) Inventors: Georg Rossmair, Stockdorf (DE); Marco Hofner, Stockdorf (DE); Michael Steigthaler, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/687,196

(22) PCT Filed: Sep. 5, 2022

(86) PCT No.: PCT/EP2022/074621
§ 371 (c)(1),
(2) Date: Feb. 27, 2024

(87) PCT Pub. No.: WO2023/031460
PCT Pub. Date: Mar. 9, 2023

(65) Prior Publication Data
US 2024/0424983 A1 Dec. 26, 2024

(30) Foreign Application Priority Data

Sep. 6, 2021 (DE) ..................... 10 2021 122 986.3

(51) Int. Cl.
*B60Q 3/208* (2017.01)
*B32B 17/10* (2006.01)
(Continued)

(52) U.S. Cl.
CPC ........ *B60Q 3/208* (2017.02); *B32B 17/10036* (2013.01); *B32B 17/10541* (2013.01);
(Continued)

(58) Field of Classification Search
CPC .......................... B60Q 3/208; B32B 17/10541
See application file for complete search history.

(56) References Cited

U.S. PATENT DOCUMENTS

2004/0130882 A1 7/2004 Hara
2009/0251917 A1 10/2009 Wollner
(Continued)

FOREIGN PATENT DOCUMENTS

DE 102012109900 A1 4/2014
DE 202014104932 U1 1/2015
(Continued)

OTHER PUBLICATIONS

Office Action issued against corresponding German Application No. 10 2021 122 986.3; dated Feb. 9, 2022 In German with English Machine Translation (12 pages).
(Continued)

*Primary Examiner* — Robert J May
(74) *Attorney, Agent, or Firm* — Fitch, Even, Tabin & Flannery, LLP

(57) ABSTRACT

A vehicle pane with a light guiding layer on the inner side of the pane and with a lighting device, which introduces light into the light guiding layer by a light input coupling device. The lighting device has at least two LEDs, and in that each LED is assigned a light input coupling element, via which light from the respective LED is introduced into the light guiding layer.

15 Claims, 10 Drawing Sheets

(51) Int. Cl.
*B60Q 3/54* (2017.01)
*B60Q 3/64* (2017.01)
*F21V 8/00* (2006.01)

(52) U.S. Cl.
CPC .............. *B60Q 3/54* (2017.02); *B60Q 3/64* (2017.02); *G02B 6/0031* (2013.01)

(56) References Cited

U.S. PATENT DOCUMENTS

| | | |
|---|---|---|
| 2011/0292318 A1 | 12/2011 | Nakamoto |
| 2014/0169034 A1* | 6/2014 | Chen .................... G02B 6/0028 362/611 |
| 2014/0240998 A1* | 8/2014 | Richard ............... G02B 6/0095 362/510 |
| 2014/0362597 A1 | 12/2014 | Verrat-Debailleul |
| 2015/0002771 A1 | 1/2015 | Nakamoto |
| 2015/0298601 A1 | 10/2015 | Bott |
| 2016/0290588 A1 | 10/2016 | Kim |
| 2018/0001751 A1 | 1/2018 | Thannheimer |
| 2020/0122637 A1 | 4/2020 | Thannheimer |
| 2023/0118480 A1 | 4/2023 | Pasquarelli |

FOREIGN PATENT DOCUMENTS

| | | |
|---|---|---|
| DE | 102015000071 A1 | 7/2016 |
| DE | 102018004528 A1 | 12/2019 |
| DE | 102019206376 A1 | 11/2020 |
| DE | 102020109338 B3 | 5/2021 |
| DE | 102020101875 A1 | 7/2021 |
| FR | 2984251 A1 | 6/2013 |
| JP | H06122343 A | 5/1994 |
| JP | 2011249170 A | 12/2011 |
| JP | 2016195097 A | 11/2016 |
| WO | 2008016978 A1 | 2/2008 |
| WO | 2018219657 A1 | 12/2018 |

OTHER PUBLICATIONS

ISR issued against corresponding PCT /EP2022/07 4621 Application; mailed Dec. 9, 2022; In German with English Translation (8 pages).

Office Action issued in corresponding Japanese Application No. JP 2024-514391; mailed Jul. 23, 2025; In Japanese with English machine translation (22 pages).

* cited by examiner

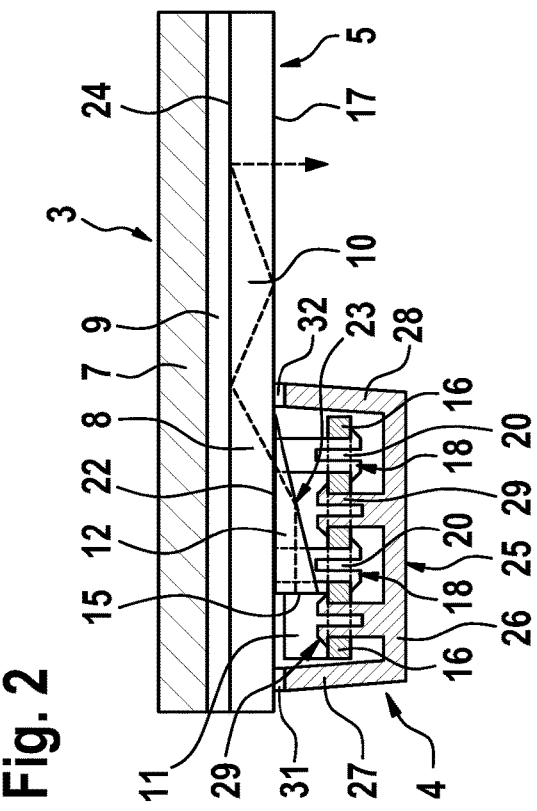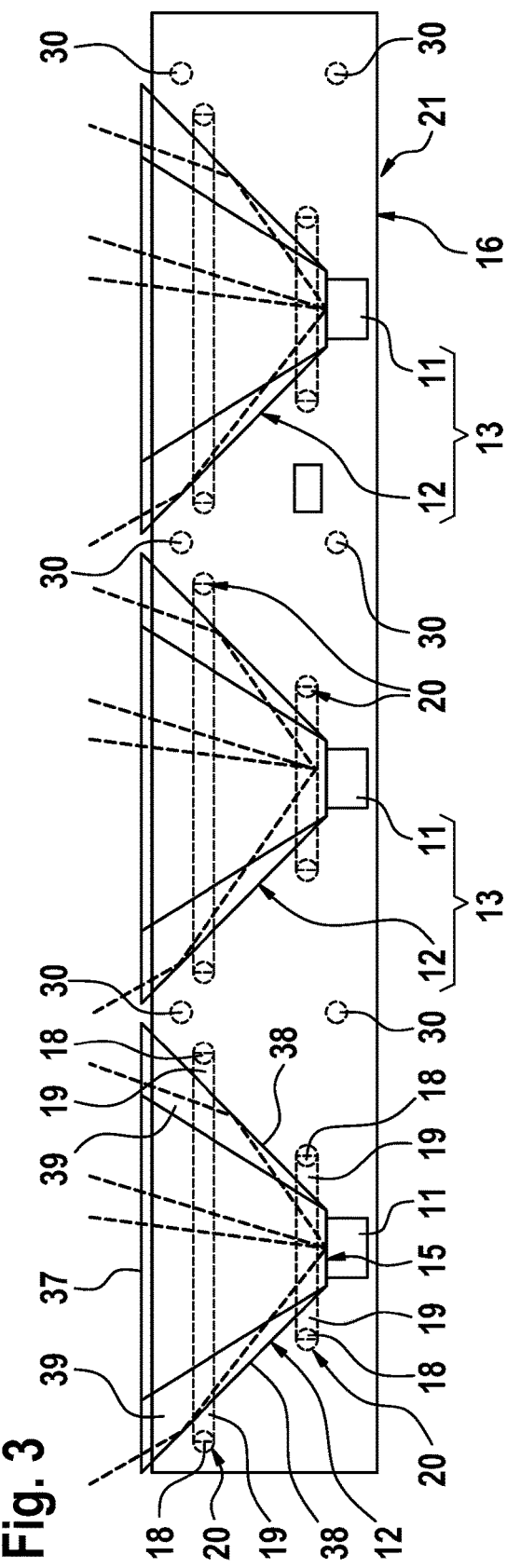

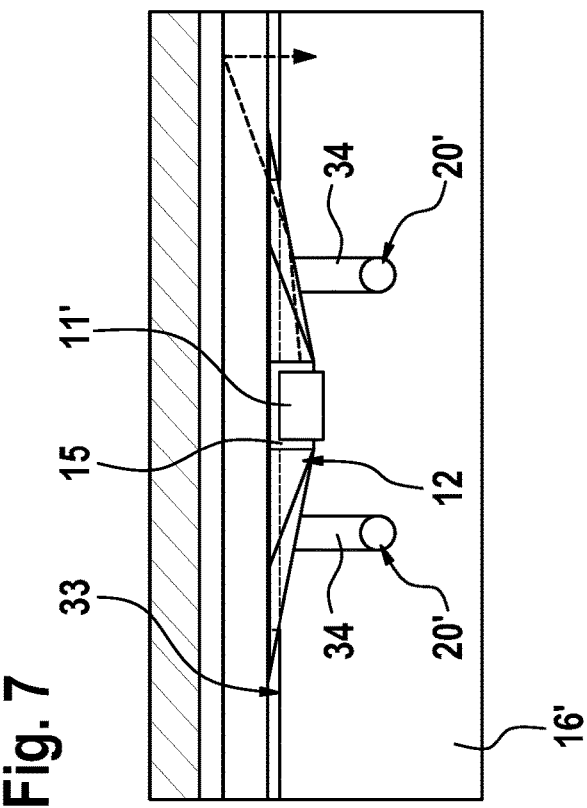
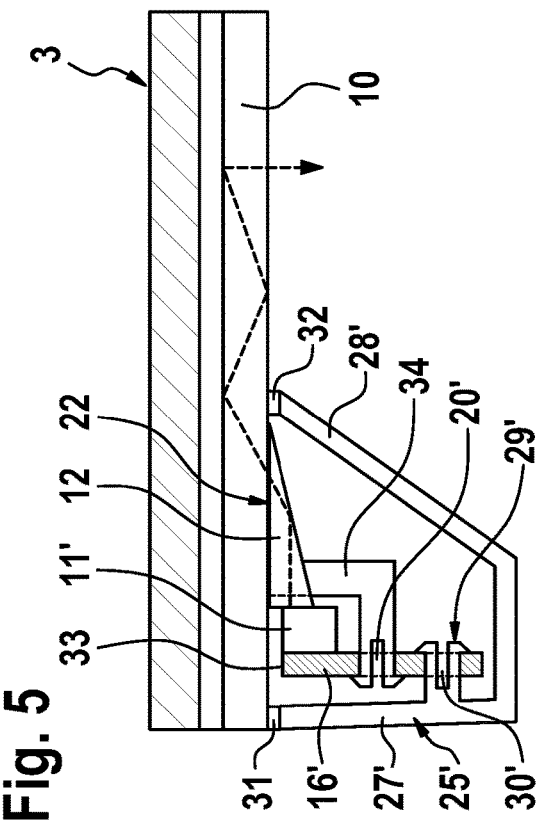
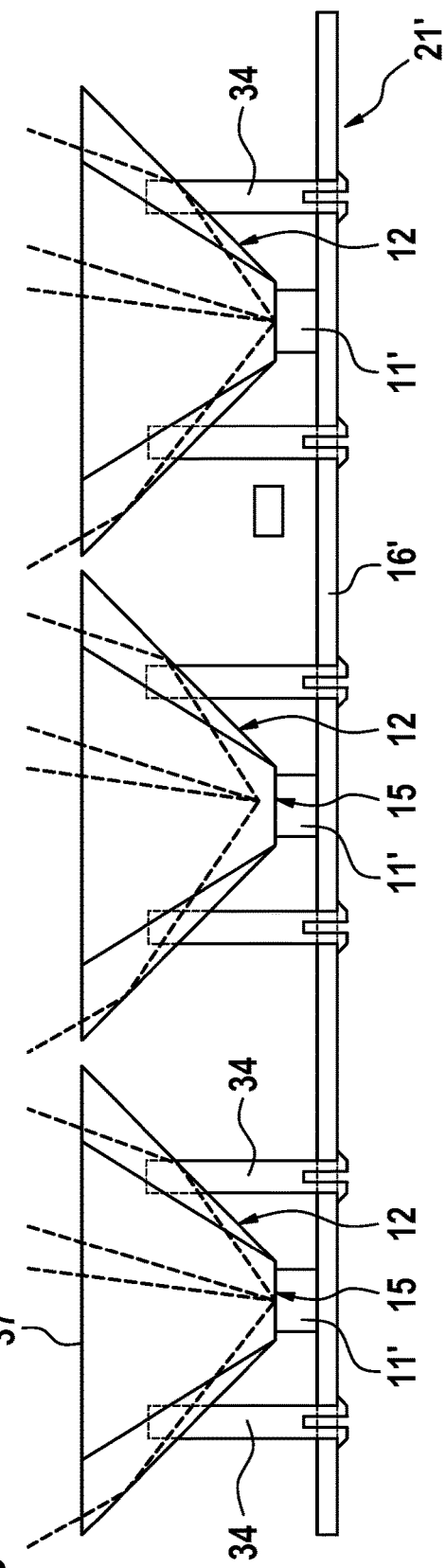

Fig. 10
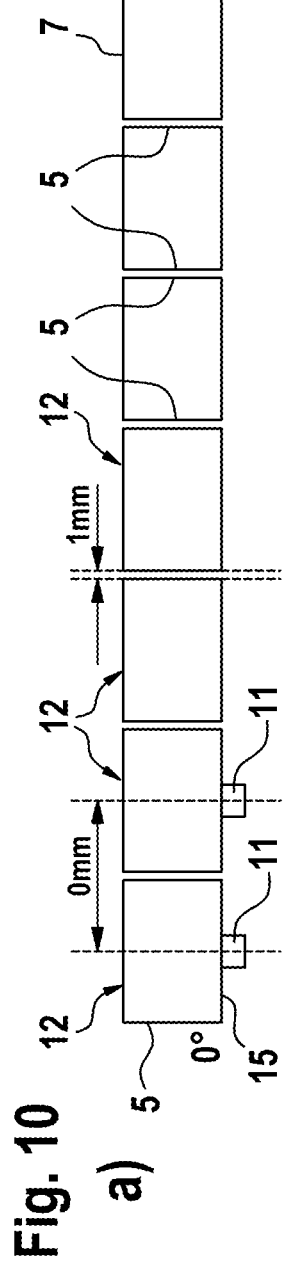
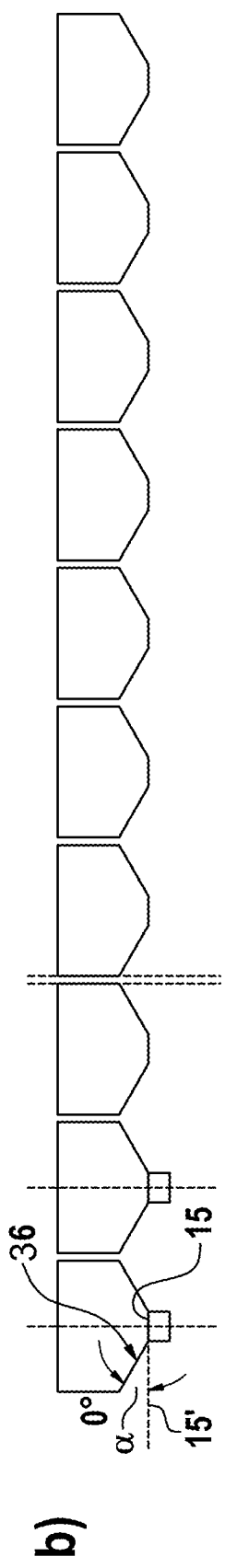
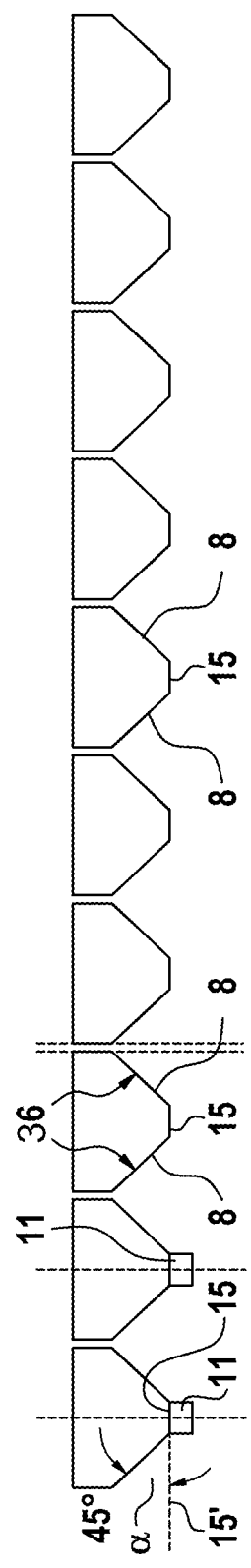
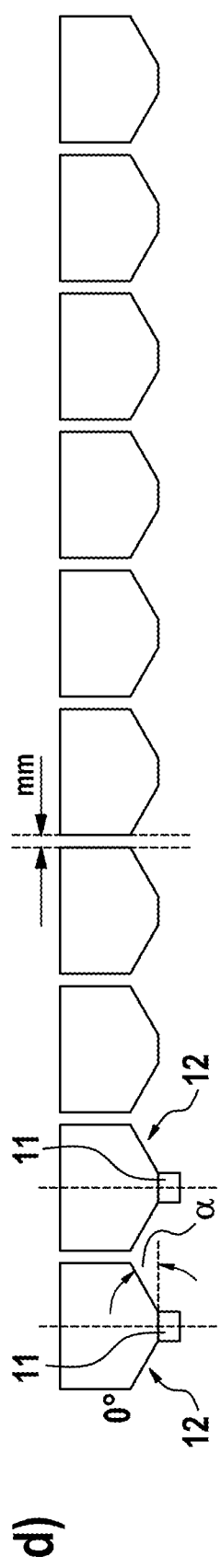

VEHICLE PANE WITH A LIGHTING DEVICE

CROSS-REFERENCE TO RELATED APPLICATIONS

This application is a U.S. national phase application filed under 35 U.S.C. § 371 of International Application No. PCT/EP2022/074621, filed on Sep. 5, 2022, published under WO 2023/031460A1 on Mar. 9, 2023, designating the United States, which claims priority from German Patent Application Number 10 2021 122 986.3, filed on Sep. 6, 2021, which are hereby incorporated herein by reference in their entirety.

FIELD

The invention relates to a vehicle pane having a light guide layer on the pane inner side and having a lighting device, which inputs light into the light guide layer by means of a light coupling-in device.

BACKGROUND

DE 10 2020 109 338 B3 discloses a generic vehicle pane. A lighting device of the vehicle pane has a light source, which is arranged on an end side of an elongated rod-shaped light guide made, for example, of PMMA or PC. The lighting device further comprises a strip-type light coupling-in element with a body that is wedge-shaped in cross section. The light coupling-in element, which is made of a plastics material such as PMMA, and the light guide extend over the length of the lighting device, wherein the light guide is arranged directly in front of a lateral longitudinal end face of the light coupling-in element. The light coupling-in element is attached via an adhesive bond to an inner side of a light guide layer formed by an inner pane of the multi-layer vehicle pane. In such a long light coupling-in element, however, high stresses can occur in the adhesive bond, which can cause the adhesive bond to become detached in the case of temperature changes and different coefficients of thermal expansion of the glass material of the light guide layer and of the plastics material of the light coupling-in element.

SUMMARY

The object on which the invention is based is to provide a vehicle pane mentioned in the introductory part, which is improved with regard to the lighting device, and to provide a method for producing such a vehicle pane.

In the vehicle pane mentioned in the introductory part, this object is achieved according to the invention in that the lighting device has at least two LEDs and each LED is assigned its own light coupling-in element, via which light from the respective LED is input into the light guide layer.

The object is also achieved by a method for producing a vehicle pane.

Advantageous configurations of the invention are specified in the dependent claims.

Thus, in the vehicle pane according to the invention, a plurality of units comprising an LED and an assigned light coupling-in element are arranged side by side in the longitudinal direction of the lighting device. In particular, a plurality of light coupling-in elements such as, for example, about 10 to 40 light coupling-in elements are arranged side by side in a row and preferably at a distance from one another. The arrangement of a plurality of individual light coupling-in elements enables an improved adaptation to a curvature of the vehicle pane in the longitudinal direction or in the direction of the longitudinally extending lighting device. This improved adaptation is advantageous in particular in the case of light coupling-in elements made of glass, since a strip-type light coupling-in element made of hard glass material and formed in the length of the lighting device is less suitable for such an adaptation to a curvature due to reduced flexibility or difficult production of curved, long glass light coupling-in elements or glass prisms.

In addition, the individual light coupling-in elements can each be designed in terms of their design and their light reflection surfaces for optimized light guidance into the light guide layer.

According to a first embodiment, provision is made for the light coupling-in elements to be attached as independent components to the light guide layer. The light coupling-in elements produced as independent components are attached to the light guide layer in particular by means of adhesive bonding, by means of potting material, by means of adhesive tape or by means of a holding or clamping device.

The light coupling-in elements are in particular wedge-shaped or formed as prismatic bodies. The light coupling-in elements can be made of glass or a plastics material such as PMMA, PC, PU or COP (cyclic olefin polymer) or COC (cyclic olefin copolymer).

A pressure-sensitive adhesive, an optically clear liquid adhesive, EVA, PVB, TPU, an epoxy adhesive or an acrylate adhesive can be used as the material for an adhesive bond. For example, a holding or clamping device is attached to the vehicle pane, e.g. by means of an edge foam of the vehicle pane. The holding or clamping device forms a fixed attachment base for the direct or indirect mounting of the light coupling-in elements.

The size of the adhesive surface of an adhesive bond is thus limited to the size of a base surface of the light coupling-in elements. In particular, if the light guide layer is a glass inner pane of the vehicle pane and the light coupling-in elements are made of a plastics material, the effects of different coefficients of thermal expansion of the materials on the individual adhesive bonds are reduced to such an extent that a detachment of the adhesive bonds of the individual light coupling-in elements can be avoided. The base surface of the light coupling-in element is in particular also a light coupling-out surface, via which light radiated by the LED is input or coupled into the light guide layer.

The materials of the light coupling-in elements and the light guide layer may have matching or similar refractive indices. If the refractive indices match, the refractive indices of the attachment means such as adhesive bond, potting material or adhesive tape are adapted to or essentially correspond to the former. If the refractive indices of the light coupling-in elements and the light guide layer differ, the refractive indices of the attachment means may have the value of the light coupling-in elements or the value of the light guide layer or a value between the two. The refractive index of the light coupling-in elements lies in the range from 1.48 to 1.59, for example. The refractive index of the light guide layer is 1.52, for example.

The light coupling-in elements are arranged in one embodiment on the light guide layer, for example by means of foam injection, adhesive bonding and/or injection molding. Even where the following text mentions foaming or foam injection, this should be read as injection molding and/or adhesive bonding, unless this is technically excluded or unless something else is described. However, for better readability, the two further processes are not explicitly mentioned below.

According to a further embodiment, provision is made for the light coupling-in elements to be foamed onto the light guide layer. A transparent foam material such as PU is injection-molded onto the light coupling-in elements, which preferably have a high light refraction. UV-stabilized TPU, aliphatic TPU for high transparency or polyisocyanates can also be used as foam material.

The adhesion of the foam material and/or the injection-molding material to the light guide layer, which is made of glass for example, is ensured by the use of an adhesion promoter. Light-resistant and UV-resistant primers are preferably used as adhesion promoters. For example, transparent aging-resistant primers which ensure color fastness and prevent color shift are used as adhesion promoters.

In order to protect the light coupling-in elements, e.g. due to aging of the light coupling-in elements, e.g. due to UV exposure or as mechanical protection, etc., a protective layer can be applied onto the light coupling-in element. In particular, such materials that are specified for the production of the light coupling-in elements are considered in this regard, e.g. aliphatic materials because of good UV resistance.

Such foamed-on light coupling-in elements can be individually designed. They can be formed, for example, with undercuts or holders, which are provided for mounting the LEDs, e.g. via a carrier carrying the LEDs. Additional components for mounting the LEDs can be largely or completely dispensed with.

The light coupling-in elements are expediently foam-injected in parallel to a foaming process in which an edge foam, for example black PU, is foamed onto the glass pane. This allows an optimization of the cycle time. Additional cleaning processes are not required. The handling of complex components such as the light coupling-in elements as components to be attached independently or of additional components such as further attachment components and the like is not necessary.

According to a further embodiment, provision is made for the light coupling-in elements to be formed in one piece with the light guide layer. A light guide layer made for example of clear glass thus includes the light coupling-in elements molded on from the same glass material during the production.

Due to this one-piece or integrated formation of the light coupling-in elements with the light guide layer, an otherwise necessary coupling or attachment of each individual light coupling-in element to the light guide layer is dispensed with. This also applies to light coupling-in elements foamed onto the light guide layer.

A light guide layer which is made of a plastics material, in particular as specified above regarding the light coupling-in elements, includes the molded-on, foamed-on or injected light coupling-in elements of the same plastics material or of a plastics material with a light refraction index equal or similar to that of the light guide layer.

According to a preferred embodiment, provision is made for each light coupling-in element to have a base surface and for each light coupling-in element to be optically connected, via its base surface, to an inner surface of the light guide layer facing a vehicle interior. In a light coupling-in element formed as a separate component, the base surface is a real outer surface of the light coupling-in element. In the case of a light coupling-in element that is foamed onto the light guide layer, the base surface is a contact surface of the foamed-on light coupling-in element. In the case of a light coupling-in element formed in one piece with the light guide layer, the base surface is a fictitious surface at the transition from the light coupling-in element to the light guide layer, wherein the fictitious surface is substantially parallel to the adjacent surface of the light guide layer.

The use of a multiplicity of individual light coupling-in elements, which in the longitudinal direction of their row arrangement are formed each with a small length, thus allows an improved adaptation to the curvature of the vehicle pane due to the individual formation, the individual shaping or the individual attachment to the light guide layer.

In those light guide elements which are optically coupled as independent components via their base surfaces, an immersion oil or a capillary oil can be used expediently to ensure optically flawless coupling.

The vehicle pane may be formed in such a way that it has an outer pane and an inner pane, e.g. a clear glass pane, connected to the outer pane by means of a connecting layer, such as a hot melt adhesive film. Expediently, the inner pane forms the light guide layer. However, the light guide layer may also be formed by another layer, such as a sheet or the like.

Expediently, the inner pane includes a structure that protrudes optically when light radiates into the inner pane. The structure is produced, for example, by screen printing or printing on the inner pane. For example, the structure can represent a pattern, emblem, or lettering, or combinations thereof.

Expediently, each light coupling-in element includes an LED surface facing an adjacent pane edge. The respective LED is positioned in front of or on the LED surface. The LED surface is preferably aligned perpendicular to the base surface, via which the light coupling-in element is coupled, attached or adhesively bonded to the light guide layer.

Preferably, each in particular wedge-shaped or prismatic light coupling-in element includes at the edges of its base surface mutually opposite inclined side edges, which-starting from a wedge tip of the light coupling-in element-converge toward the LED surface. The inclined side edges are each arranged at an acute angle to an extension of the LED surface. The size of the acute angle lies in the range from, for example, 10° to 70° and in particular in the range from 30° to 45°.

According to a further preferred embodiment, provision is made for each in particular wedge-shaped or prismatic light coupling-in element at each inclined side edge to have, starting from the inclined side edge, an inclined reflection surface, which is arranged perpendicular to the base surface.

According to a further alternative embodiment, provision is made for each, in particular, wedge-shaped or prismatic light coupling-in element at each inclined side edge to have, starting from the inclined side edge, an inclined reflection surface, which has, starting from the inclined side edge, an inclined side reflection surface, which is arranged at an acute angle to the base surface. The size of the acute angle lies in the range from, for example, 35° to 70°.

The light reflection in the light coupling-in element and thus the quality of the lighting can be adjusted as desired by means of the design of the angles of the inclined side edges and by means of the inclination of the additional side reflection surfaces.

By designing the light coupling-in element with such, for example, facet-like, side reflection surfaces and inclined reflection surfaces, material that is otherwise present in these regions is saved. In addition to material savings, possible thermal expansion stresses in the light coupling-in element are reduced due to the smaller amount of material.

In such light coupling-in elements which are attached as independent components to the light guide layer, provision is made according to a preferred embodiment for the LEDs to be attached to a carrier and for the light coupling-in elements to be positioned at and attached to the carrier assigned to the respective LED. The carrier is preferably a PCB (printed circuit board). The carrier can also be used to supply the LEDs with power and to control them.

Preferably, a lighting module comprising the carrier with the LEDs and the light coupling-in elements is attached to the light guide layer by means of the light coupling-in elements. The carrier does not require its own attachment or adhesive bond to the light guide layer. The attachment is preferably effected by means of the above-described attachment of the light guide elements to the light guide layer, in particular by means of adhesively bonding the light guide elements to the light guide layer. Thus, only an adhesive bonding process is required for adhesively bonding the light coupling-in elements.

Expediently, each light coupling-in element includes at least one attachment element with which the light coupling-in element can be attached to the carrier. In a light coupling-in element produced as a plastics injection-molded part, the attachment element is advantageously a molded-on component. However, the attachment element may also be a different part of the light coupling-in element or a part attached thereto.

According to a preferred embodiment, provision is made for the light coupling-in elements to hold the carrier substantially parallel to the inner surface of the light guide layer. The LEDs emit light emitted from their sides (so-called "side LEDs") via the LED surfaces into the light coupling-in elements. In this design, the LEDs can be positioned close to the light guide layer, as there is no need for a holder between the LEDs and the light guide layer. A parallel arrangement of the carrier should not be understood to mean parallelism in the strictly mathematical sense. Rather, a parallel arrangement of the carrier should be understood to be an arrangement with some inclination relative to the light guide layer, for example at an angle of up to 15° or 20°.

It is therefore particularly preferred if the LEDs are arranged between the carrier and the light guide layer and adjacent to the light guide layer or directly on the light guide layer. This reduces the required installation height. Furthermore, the light coupling-in elements with a lower height can be used.

Expediently, the carrier covers the light coupling-in elements at least partially from below. This means that the light coupling-in elements can be easily and securely attached to the carrier. This also reduces unwanted coupling-out of light in the region of the LEDs or the light coupling-in elements.

According to a further alternative embodiment, provision is made for the light coupling-in elements to hold the carrier substantially perpendicular to the inner surface of the light guide layer and for the LEDs to emit light radiated from their top sides (so-called "top LEDs") via the LED surfaces into the light coupling-in elements. Even in this embodiment, the LEDs can be positioned close to the light guide layer or directly on the light guide layer, as there is no need for a holder between the LEDs and the light guide layer. The LEDs can be arranged, for example, at an upper edge of the carrier adjacent to the light guide layer. An arrangement of the carrier perpendicular to the light guide layer is not limited to an arrangement at an exact right angle. Rather, a perpendicular arrangement of the carrier should also be understood to be an arrangement with some deviation from a right angle, for example at an angle of up to 15° or 20°.

A cover is expediently connected to the carrier. The cover covering the lighting module also represents a shield that can, for example, shield stray light coming from the light coupling-in elements.

According to a preferred embodiment, the cover is held at or attached to the light guide layer. The cover holds the carrier with the light coupling-in elements arranged thereon correctly positioned on the light guide layer. The cover can hold the carrier connected elastically in such a way that the cover in its position on the light guide layer holds the carrier elastically preloaded against the light guide layer. This supports optically correct positioning of the light coupling-in elements on the light guide layer.

According to an alternative embodiment, the cover is attached to the carrier and held in position by the carrier on the light guide layer. The carrier is attached here to the light guide layer by means of the light coupling-in elements. Since the cover is attached to the carrier, no other attachment for the cover is required.

Preferably, the cover is formed with a longitudinal curvature, which is adapted to a curvature of the light guide layer or the vehicle pane and in particular matches it. If the cover is sufficiently rigid, it can make the carrier carrying the light coupling-in elements bulge out accordingly when the carrier is attached together with the cover to the light guide layer.

Expediently, a seal between the cover and the light guide layer is provided. The seal is produced preferably together with the cover in a 2 K injection molding process. However, the seal can also comprise independent sealing elements.

According to a preferred embodiment, provision is made for each light coupling-in element arranged (e.g. foamed-on) or formed in one piece with the light guide layer to have a holder and for the holders to position the carrier carrying the LEDs at the light coupling-in elements. The holder is expediently formed at the light coupling-in element on its top side, which lies opposite the base surface. For example, the holder is formed as a plug-on unit for a carrier, which is formed by a PCB, for example, and has a plurality of LEDs.

The foamed-on light coupling-in elements are advantageously connected to one another via connecting bridges, which are formed during foaming, when the foam material flows from a cavity of one light coupling-in element via a distribution channel segment to the nearest cavity of the adjacent light coupling-in element.

In the method according to the invention for producing such a vehicle pane with a lighting device, provision is made for a carrier with attached LEDs. Furthermore, the light coupling-in elements are fixedly connected to the carrier in each case assigned to one of the LEDs. Finally, a lighting module comprising the carrier with the LEDs and the light coupling-in elements is attached to the light guide layer with optical coupling of the light coupling-in elements to the light guide layer by either attaching the light coupling-in elements to the light guide layer or by attaching a cover, which is connected to the carrier and covers the lighting module, to the light guide layer, thus positioning and fixing the carrier. This method simplifies installation, as only the light guide elements need to be attached or adhesively bonded to the light guide layer and the carrier itself does not require additional independent or direct attachment to the light guide layer. The light guide elements or prisms can be mounted on the carrier by means of a pick-and-place robot.

In a modified alternative method, the individual light guide elements or prisms can first be attached or adhesively bonded to the light guide layer by means of a pick-and-place robot. The carrier including the LEDs is then positioned at the light guide elements or prisms and firmly connected thereto.

In a further preferred method for producing such a vehicle pane with a lighting device, provision is made for the light guide layer to be formed with integrally molded light coupling-in elements or for the light coupling-in elements to be foamed onto the light guide layer. Provision is also made for the light coupling-in elements to be provided with holders for a carrier for carrying the LEDs. Finally, the carrier is attached to the holders. The LEDs are positioned here at the light coupling-in elements.

The vehicle pane according to the invention can be any pane of a vehicle glazing, for example a lid arranged fixedly or movably in a roof opening, a glazing of a roof module or panoramic roof, or a side pane, a rear pane, or a front pane.

BRIEF DESCRIPTIONS OF THE DRAWINGS

Subsequently, the invention is explained in more detail with reference to the drawing using exemplary embodiments of a vehicle pane according to the invention. In the figures:

FIG. 2 shows a cross-sectional view of an edge region of the vehicle pane with a lighting device having an LED and an assigned light coupling-in element;

FIG. 3 shows a top view of the lighting device with a plurality of LEDs and assigned light coupling-in elements;

FIG. 4 shows a side view of the lighting device with the LED and the assigned light coupling-in element of FIG. 2;

FIG. 5 shows a cross-sectional view of a second embodiment of the lighting device;

FIG. 6 shows a top view of the lighting device of FIG. 5 with a plurality of LEDs and assigned light coupling-in elements;

FIG. 7 shows a side view of the lighting device of FIG. 5;

FIG. 10 shows a top view of four rows of differently designed light coupling-in elements;

DETAILED DESCRIPTION

Figure 1:
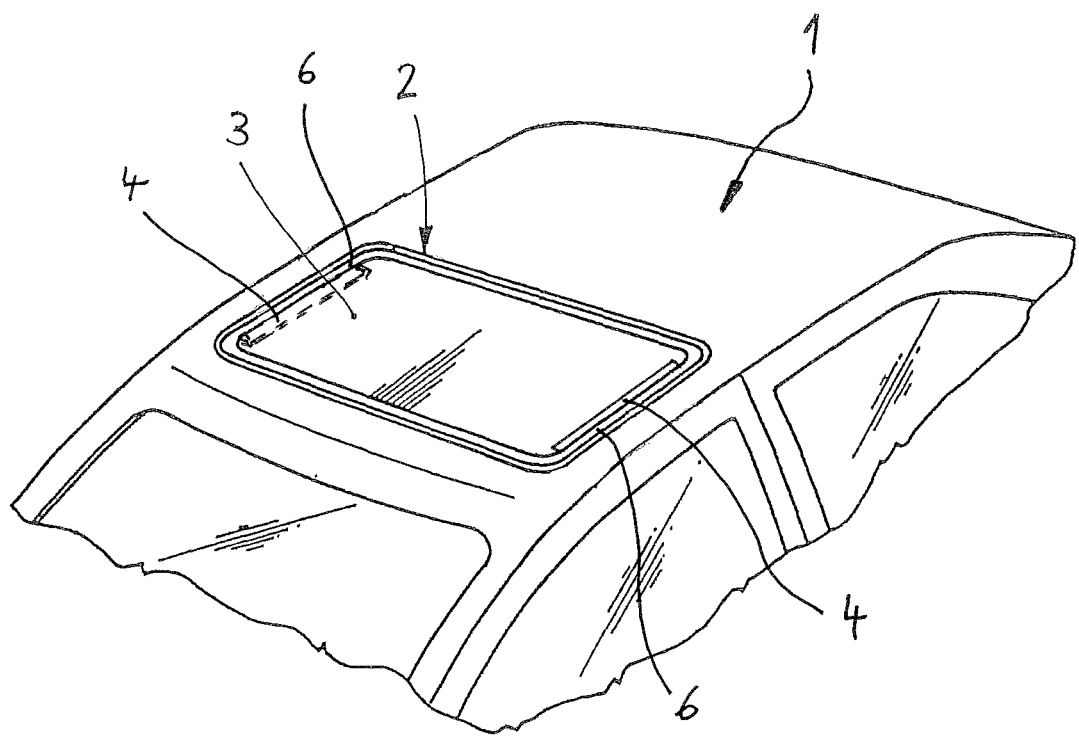
FIG. 1 shows an isometric view of a vehicle roof with a vehicle pane according to the invention.

A vehicle such as a passenger car comprises a vehicle roof 1 (FIG. 1) with a roof opening 2, in which a vehicle pane 3 is arranged which, for example, is fixedly arranged in the roof opening 2 or is formed as a lid, which is mounted movably in the roof opening 2 by means of a bearing device and is adjustable between a closed position and ventilation or opening positions in a manner known per se. The vehicle pane 3 may also be a fixed part or portion of a roof module or panoramic roof. The vehicle pane 3 has one lighting device 4, which is arranged on the pane inner side 5 and is preferably arranged along a respective side edge 6 of the vehicle pane 3.

The vehicle pane 3 comprises (see FIGS. 2 and 3) an outer pane 7, an inner pane 8, and a connecting layer 9, which connects the outer pane 7 and the inner pane 8 with one another and includes, for example, a laminate layer, laminate film or hot-melt adhesive film. For example, the outer pane 7 is a tinted glass pane. The inner pane 8 is in particular a transparent glass pane or clear glass pane, which forms a light guide layer 10.

The lighting device 4 has a plurality of LEDs 11 and a plurality of light coupling-in elements 12, wherein one LED 11 and one light coupling-in element 12 form a lighting unit 13. A plurality of such lighting units 13 are arranged side by side in a row and preferably at a distance from one another. For example, the distance between two adjacent LEDs 11 is 30 mm. The lighting device 4 at the side edge 6 of the vehicle pane 4 thus comprises, for example, about 20 to 30 lighting units 13. The length of an individual light coupling-in element 12 in the longitudinal direction of the row arrangement is, for example, about 25 to 28 mm. This length specification refers in particular to the front edge of the wedge-shaped or prismatic light coupling-in element 12, which tapers in the form of a wedge tip 37.

The light coupling-in element 12 represents an optical prism and is, for example, a plastics injection-molded part. The light coupling-in element 12 has a base surface 14 and an LED surface 15, which is preferably arranged perpendicular to the base surface 14 and assigned to the LED 11. According to a first embodiment (FIGS. 2 to 4), the LEDs 11 are fixedly attached to a carrier 16, which is, for example, a PCB (printed circuit board), which is preferably designed as a two-dimensional strip-type component and via which the power supply of the LEDs 11 and control thereof are effected. The flat carrier 16 is arranged in an installation position approximately parallel to the pane inner side 5 and to the inner surface 17 of the inner pane 8 and is arranged at a distance therefrom. In this embodiment, the LEDs 11 are LEDs that emit the light from their sides and thus radiate the light parallel to the carrier 16 in their position on the carrier 16, in which they are located on the side of the carrier 16 facing the light guide layer 10.

The light coupling-in element 12 has attachment elements 18, which are molded on during the injection molding, are formed for example as pins with clips, and protrude from the light coupling-in element 12 on its top side lying opposite the base surface 14. The light coupling-in element 12 has, for example, four of these attachment elements 18, wherein in each case two of the attachment elements 18 are molded onto each of the two sides of the light coupling-in element 12 via short arms 19.

The carrier 16 has four holes 20 in each case assigned to each LED 11 and to the four attachment elements 18. The light coupling-in element 12 is arranged and attached by means of the attachment elements 18, which can be placed in the holes 20, at and to the carrier 16 inwardly next to the LED 11—inwardly with respect to the side edge of the vehicle pane in the transverse direction or y-direction—such that the light coupling-in element 12 with its LED surface 15 directly adjoins the LED 11.

A lighting module 21, which comprises a carrier 16 with a plurality of lighting units 13 each including one LED 11 and one light coupling-in element 12, is attached to the light guide layer 10 as a unit by means of attaching each light coupling-in element 12 via its base surface 14 to the inner surface 17 of the inner pane 8 by means of an adhesive bond 22 (FIG. 2), for example, a transparent adhesive or a transparent adhesive tape. Each light guide element 12 guides light radiated in by the LED 11 via at least one top-side reflection surface 23, located opposite the underside base surface 14, into the light guide layer 10, in which the light is incident by way of further total internal reflection on a light coupling-out structure 24, for example a print on the light guide layer 10, and is radiated therefrom to the vehicle interior.

The arrangement of a plurality of individual short or narrow light coupling-in elements 12 or prisms has the advantage that stresses in the respective adhesive bonds of the individual light coupling-in elements 12 or prisms which may occur at temperature changes and at different thermal expansions of the glass pane, the light guide layer 10, and the individual plastics prisms as light coupling-in elements 12 are substantially reduced in comparison with stresses in the adhesive bond of a long light coupling-in element, over the length of which many LEDs which radiate their light into this one light coupling-in element are arranged.

In particular in the case of vehicle panes 3 curved in the longitudinal direction, the arrangement of a plurality of individual short light coupling-in elements 12 or prisms is advantageous because these short light coupling-in elements 12 or prisms can adapt better to such a curvature compared with an individual long light coupling-in element or prism.

Furthermore, the LEDs 11 can be arranged very close to the light guide layer 10 via the carrier 16, since an attachment element or carrier between the LED 11 and the light guide layer 10 is not required. This allows the required installation height of the light coupling-in element 12 or prism perpendicular to the light guide layer or the height of the LED surface 15 to be reduced.

Furthermore, the respective mutual arrangement of the LED 11 and the assigned light coupling-in element 12 or prism on the one carrier 16 increases the positioning accuracy and reduces any occurring tolerances in an otherwise separate assembly of the LED and the assigned light coupling-in element or prism on a respective carrier component.

When mounting the lighting module 21 on the light guide layer 10, only the adhesive bond 22 of the light coupling-in elements 12 or prism to the light guide layer 10 is required. An otherwise additional own attachment of the LEDs to the light guide layer 10 is not required.

The attachment of the light coupling-in elements 12 or prisms to the carrier 16 can also be carried out, rather than by means of the attachment elements 18, via an adhesive bond or other attachment means, e.g. in light coupling-in elements 12 made of glass or in glass prisms. The attachment can also be effected by means of potting material, by means of adhesive tape or by means of a holding or clamping device.

A cover 25 for the lighting module 21 is formed, for example, in the shape of a trough and has a bottom wall 26 and two side walls 27 and 28. Attachment elements 29 that face upward and are provided for engagement in assigned openings 30 in the carrier 16 are arranged at or molded onto the bottom wall 26 on the inner side. For attachment of the cover 25, the attachment elements 29, which have, for example, clips, engage in the openings 30 and hold the cover 25 on the carrier 16 by means of clamping or latching, in particular with a form fit. Instead of using attachment elements 29, the cover 25 can also be attached by gripping around the edge side of the carrier 16 in a clamping or latching engagement. The two side walls 27 and 28 have on their two free edges seals 31 and 32, which rest tightly against the light guide layer 10. The cover 25 is in particular a plastics injection-molded part, in which the seals 31, 32 are molded on in a 2K injection molding process.

The cover 25 may expediently be shaped in its longitudinal extension with a curvature corresponding to the curvature of the associated vehicle pane.

According to a modified embodiment (see FIGS. 5 to 7), the carrier 16', expediently also a PCB, is arranged upright in its installation position and substantially vertically to the light guide layer 10. The LEDs 11' are mounted on the carrier 16' in the region of its upper edge 33, which is adjacent to the light guide layer 10, on its inward facing side in relation to the lid. In this embodiment, the LEDs 11' are LEDs that emit the light radiating from their top sides and thus in their position on the carrier 16' radiate the light perpendicular to the carrier 16' and parallel to the light guide layer 10.

Each light coupling-in element 12 is, for example, attached to the carrier 16' via two for example angled attachment arms 34 such that its LED surface 15 for the light radiation from the LED 11' directly adjoins the LED 11'. In this embodiment, the attachment arms 34 can also engage in openings or holes 20' in the carrier 16' via clip connections.

During assembly, the lighting module 21' is attached to the light guide layer 10 by means of adhesive bonds 22 of the individual light coupling-in elements 12 to be implemented simultaneously.

The attachment of the cover 25' is effected via attachment elements 29', which have, for example, clips, engage in openings 30' in the carrier 16' and hold the cover 25' attached on the carrier 16' by means of clamping or latching, in particular with a form fit. The attachment elements 29' are, for example, arranged at or molded onto the outer side wall 27' of the cover 25' so as to face inward. According to the previous embodiment, the cover 25' has seals 31, 32 at the edges of the side walls 27' and 28'.

The advantages of this embodiment shown in FIGS. 5 to 7 substantially correspond to those of the first embodiment shown in FIGS. 2 to 4.

In both embodiments, the height of the light coupling-in element 12 or prism in the region of the LED surface 15 adjoining the LED and thus also the width or length of the light coupling-in element 12 or prism can be reduced due to the arrangement of the LEDs 11, 11' in the vicinity of the light guide layer 10 or directly adjoining the light guide layer 10. Thus, the number of individual light coupling-in elements 12 can be increased via the length of the lighting device 4, as a result of which the quality of the lighting can be improved.

The following description of the light coupling-in elements 12 relates to light coupling-in elements which are attached as independent components to the light guide layer 10, for example by adhesive bonding, or which are foamed on, injected or adhesively bonded as foam elements or injection-molded elements to the light guide layer 10, or which are also formed in one piece with the light guide layer 10, wherein in this case the base surface 14 of the light coupling-in element 12 is a fictitious surface parallel to the surface of the light guide layer 10 or to the pane inner side 5.

Figure 8:
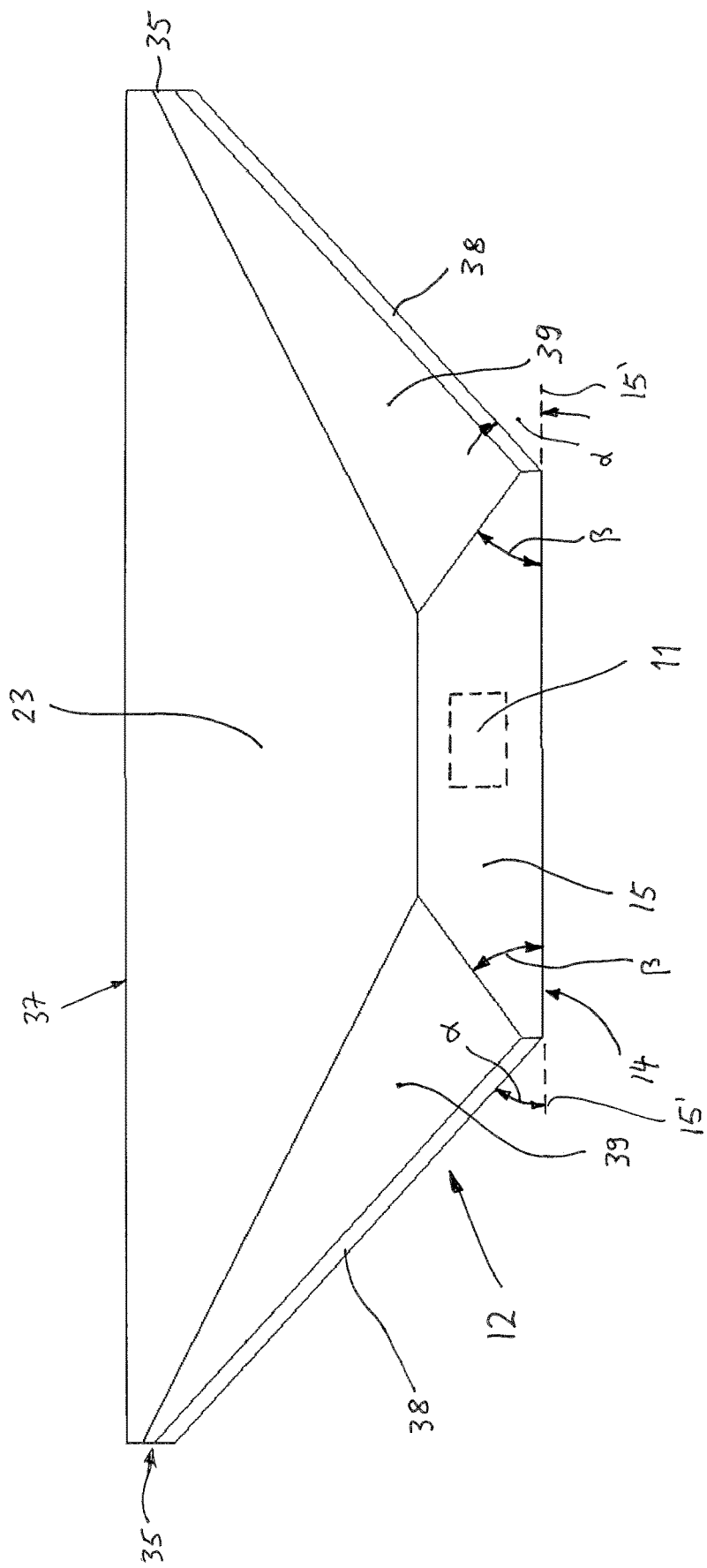
FIG. 8 shows an isometric view of an embodiment of a light coupling-in element.
Figure 9:
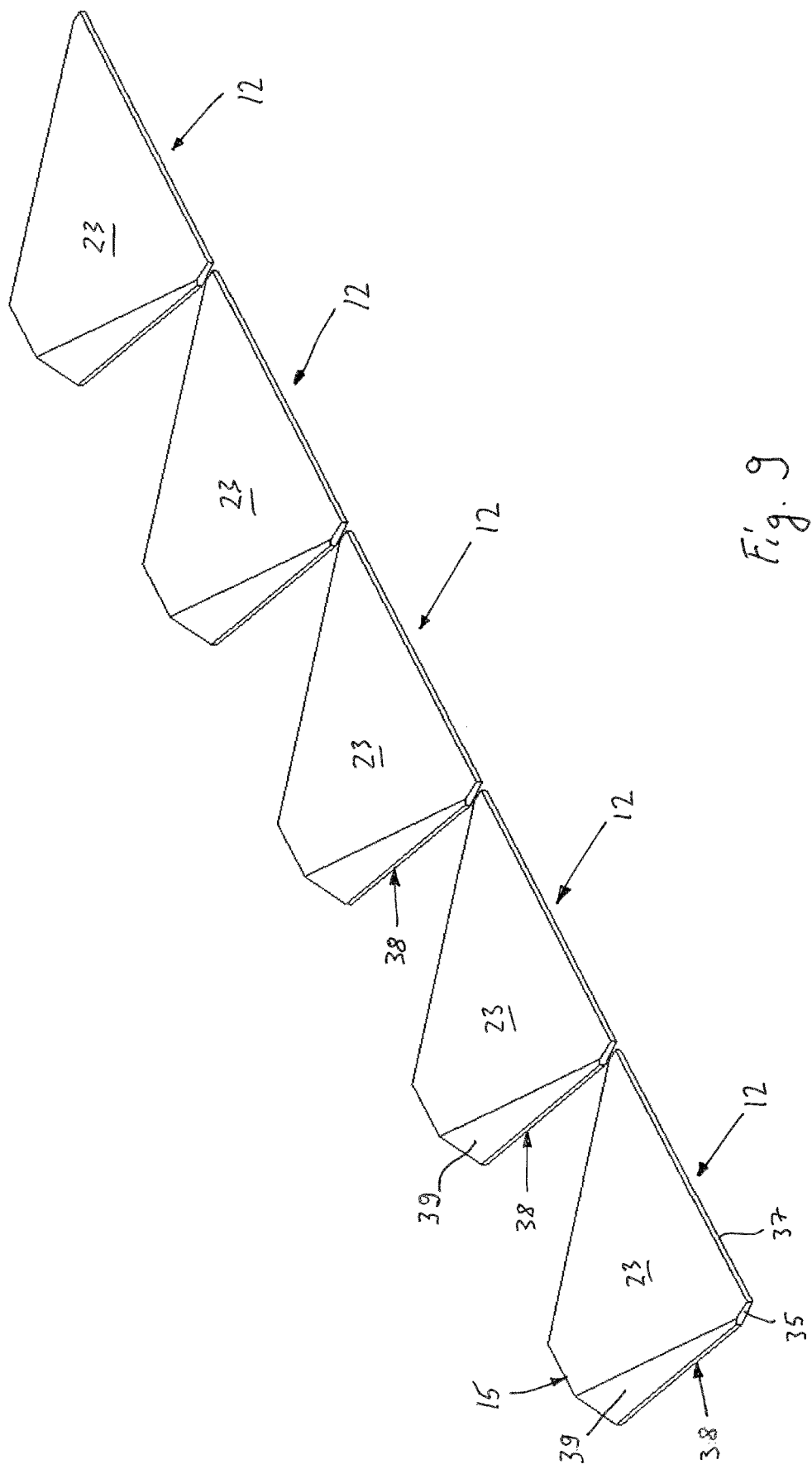
FIG. 9 shows an isometric view of a plurality of the light coupling-in elements shown in FIG. 8 in a row arrangement.
Figure 11:
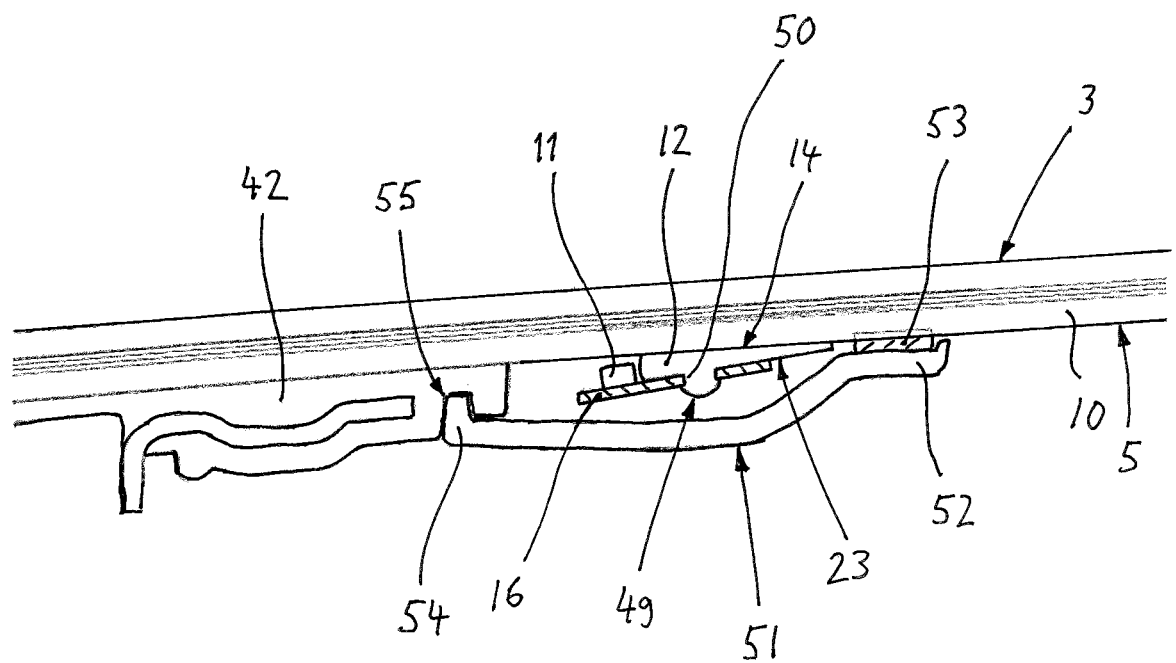
FIG. 11 shows a cross-sectional view of the vehicle pane with a foamed-on light coupling-in element.

Each light coupling-in element 12 (see FIGS. 8 to 10) is preferably formed in a wedge shape, with a wedge tip 37 located opposite the LED surface 15, in a side view (see FIG. 2). The LED surface 15 is arranged on the irradiated side of the light coupling-in element 12 in particular at right angles to the base surface 14. The light coupling-in element 12 has in each case one side edge 35 on its flanks on the two sides. The two mutually opposite side edges 35 are, for example, parallel to each other (FIG. 10a) so that the light coupling-in element 12 thus has a rectangular base surface 14. The side edges 35 are included in the two wedge-shaped and mutually parallel side surfaces. These parallel side surfaces also form reflection surfaces for light radiated into the light coupling-in element 12 by the LED 11. The LED surface 15 extends in its width between the two side edges 35 over the entire width of the light coupling-in element 12 or over its length in the direction of the row arrangement. The individual light coupling-in elements 12 with the parallel side edges 35 are arranged in the row arrangement of FIG. 10a, in which they are connected to the carrier 16 or are arranged at or adhesively bonded to the light guide layer 10, with a respective distance between their side edges 35 of, for example, at least 1 mm or 3 mm (FIG. 10d).

The light guide element 12 can be formed with an LED surface 15 that is reduced in its width direction (FIGS. 8, 9 and 10b to 10d). The light guide element 12, which is designed in this way, is beveled starting from this narrow LED surface 15 toward each side edge 35 at an angle α relative to the LED surface 15. Thereby, an in particular planar inclined reflection surface 36 is formed on both sides of the LED surface 15. The inclined reflection surface 36 extends up to the correspondingly shortened side edge 35 or up to the shortened wedge-shaped parallel side surface. Each inclined reflection surface 36 forms an inclined side edge 38 in the transition to the base surface 14. The angle α is the outer angle between the inclined reflection surface 36 or the inclined side edge 38 and an imaginary extension 15' of the plane of the LED surface 15. The angle α is, for example, 30° (FIGS. 10b and 10d) or 45° (FIG. 10c).

Furthermore, each light guide element 12 can have an inclined side reflection surface 39 on its two lateral flanks in the region of the inclined side edges 38. The side reflection surface 39 extends, starting from the inclined side edge 38, toward the reflection surface 23 at an acute angle β, measured in the plane of the LED surface 15 (see FIG. 8). The angle β lies in a range from, for example, 35° to 70°. The side reflection surface 39 thus has approximately a triangular shape.

Light radiated by the LED 11 into the light guide element 12 is reflected via the reflection surface 23 as the main reflection surface and via the two inclined reflection surfaces 36 or via the two additional side reflection surfaces 39 and coupled into the light guide layer 10. The light reflection in the light coupling-in element 12 and thus the quality of the lighting can be adjusted by the stipulation of the angle α of the inclines or the inclined reflection surfaces 36 and also of the angle β of the inclination of the side reflection surfaces 39.

Ambient light lighting can be provided by means of the two lighting devices 4, which are arranged symmetrically with respect to a vertical longitudinal central plane of the roof in the region of the respective side edge of the vehicle pane 3.

Figure 12:
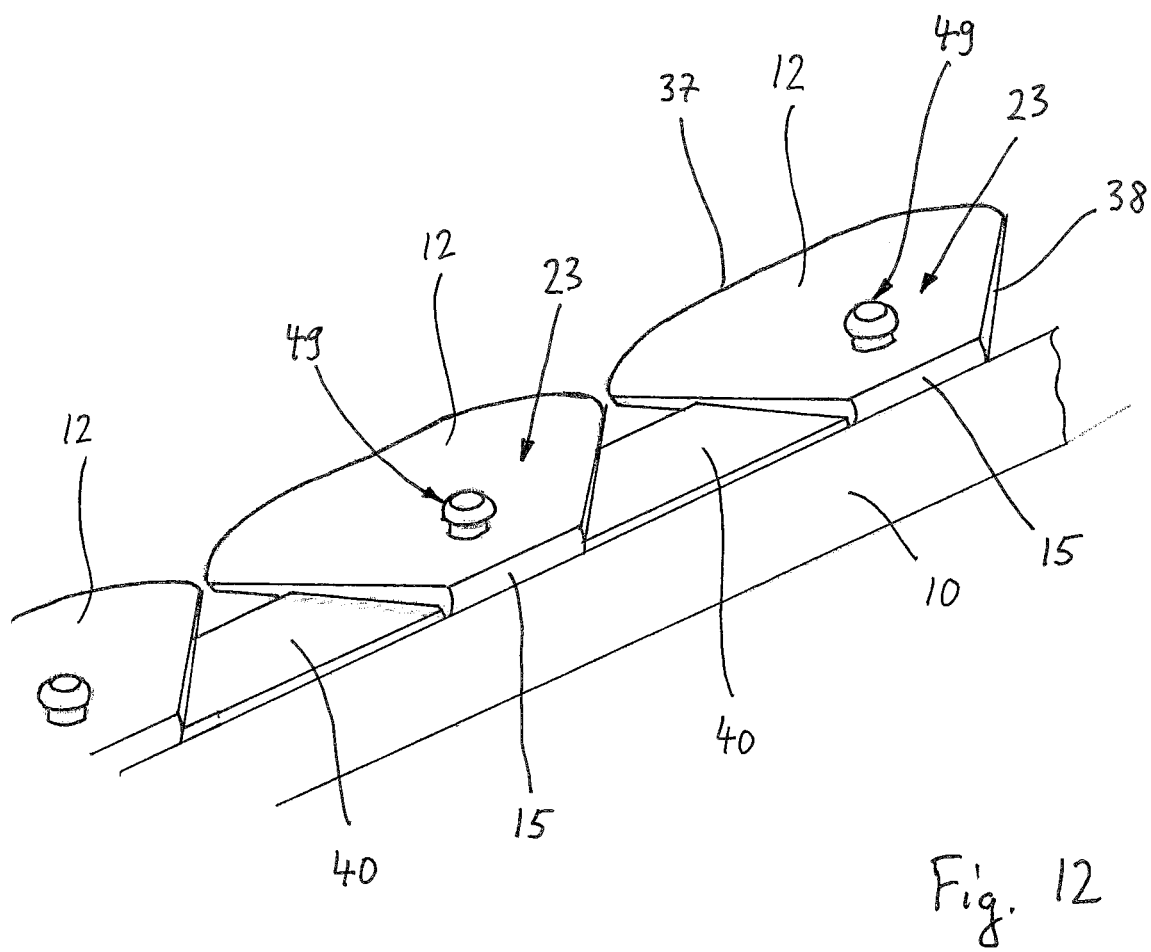
FIG. 12 shows an isometric view of a plurality of light coupling-in elements foamed onto the vehicle pane.

In a modified embodiment of the vehicle pane 3 (see FIGS. 11 to 15), the light coupling-in elements 12 are foamed at the pane inner side 5 onto the light guide layer 10. The light coupling-in elements 12 are arranged side by side in a row (see FIG. 14) and preferably connected to one another via connecting bridges 40 (FIG. 12). In each case two adjacent light coupling-in elements 12 are connected to each other via such a connecting bridge 40. A vehicle pane 3 is arranged for foaming on the light coupling-in elements 12 in a foaming tool, which has a cavity 41 (FIG. 13) for an edge foam 42 of the vehicle pane 3. The cavity 41 should be filled with foam material, e.g. black standard polyurethane, via a sprue channel 43 provided in the tool.

A further cavity 44 of the foaming tool includes a mold cavity 45 for each light coupling-in element 12. A sprue channel 46 leads to a first mold cavity 45 in the tool. A distribution channel 47 connects the further mold cavities 45 to one another, wherein in each case two adjacent mold cavities 45 are connected to each other via a respective channel segment 48 of the distribution channel 47. The injected foam material forms a light coupling-in element 12 foamed onto the light guide layer 10 in each mold cavity 45 and a respective connecting bridge 40 in the channel segments 48. The channel segments 48 have such a shape that each connecting bridge 40 is preferably in the form of a flat strip (FIG. 12), which is foamed onto the inner surface of the light guide layer 10.

Expediently, the light coupling-in elements 12 (FIG. 11) are formed in principle with such a shape as it is described above (see in particular FIGS. 8 to 10). Each light coupling-in element 12 furthermore includes a holder 49, which is formed on its top side located opposite the base surface 14 or its top-side reflection surface 23. The holder 49 is formed, for example, as a plug-on unit for a carrier 16, for example a PCB, which includes a plurality of LEDs 11. The LEDs 11 are arranged side by side in a row assigned to the LED surfaces 15 of the light coupling-in elements 12 on the carrier 16 such that when the carrier 16 is plugged onto the holders 49 of the light coupling-in elements 12, the correct assignment of the LEDs 11 to the LED surfaces 15 is produced. The holder 49 is formed, for example, as a pin-shaped or mushroom-shaped elevation, which engages in an opening 50 in the carrier 16 and fixes the carrier 16 expediently with a releasable latching engagement, so that, for example, defective LEDs 11 can be replaced together with the carrier 16.

Figure 13:
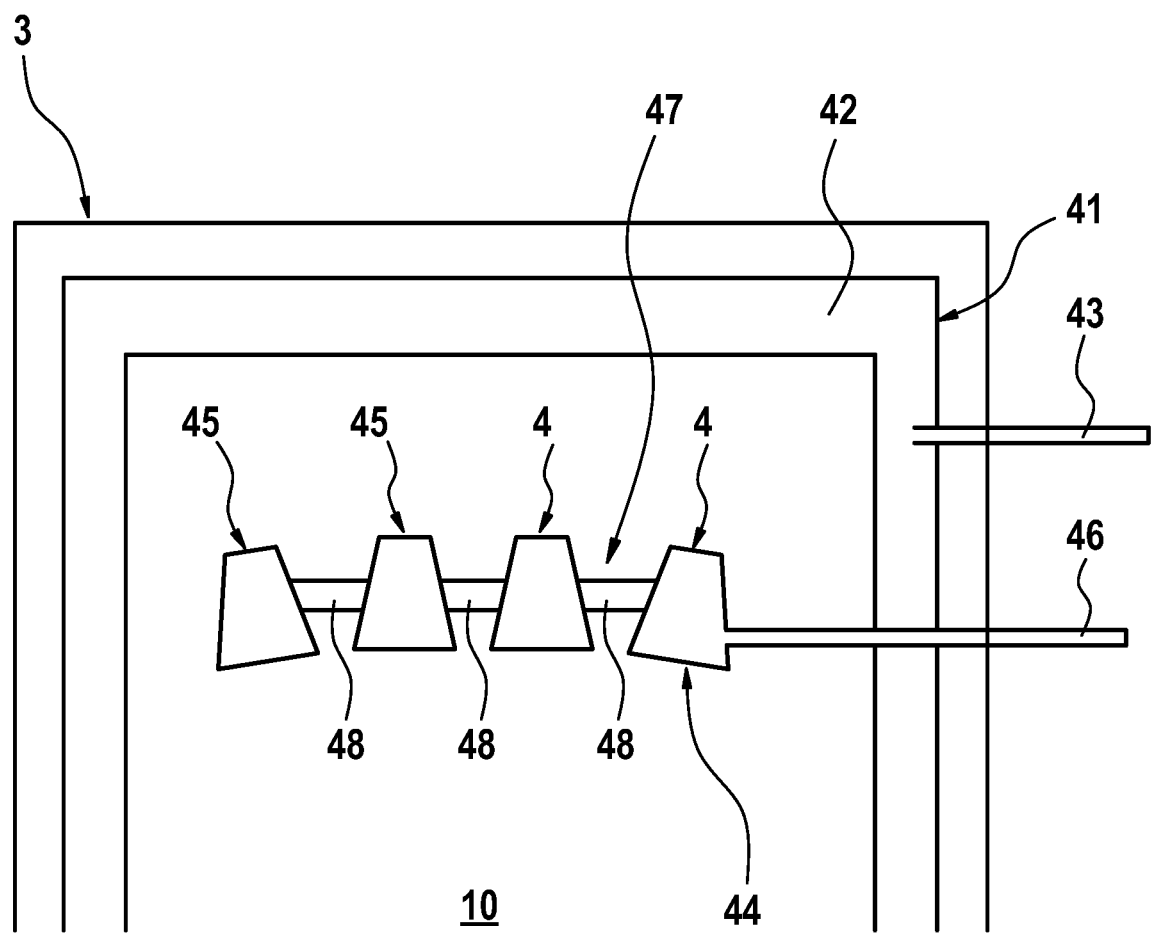
FIG. 13 shows, in a top view, a schematic illustration of a vehicle pane with a plurality of light coupling-in elements, with an edge foam, and with associated sprue channels of a foaming tool.

A vehicle roof often has an upward curvature. A vehicle pane 3 of the vehicle roof which has a corresponding curvature is curved in the longitudinal direction (x-direction) along the row of light coupling-in elements 12. The elongate strip-type carrier 16, which includes a multiplicity of LEDs 11, is attached to the light coupling-in elements 12 via the holders 49. The carrier 16 adapts to the curvature of the vehicle pane 3 along the row of light coupling-in elements 12 with an approximately arcuate deformation. This arcuate deformation causes at least some LEDs 11 to give up their mutually parallel alignment and to be aligned with little mutual angular offset. Accordingly, at least some assigned light coupling-in elements 12 are arranged pivoted in relation to one another. FIG. 13 shows schematically and by way of example a pivoted arrangement of the two outer light coupling-in elements 12 based on the associated mold cavities 45.

An elongate cover 51 (FIG. 11) of the light coupling-in elements 12 is attached at its inner edge 52 inwardly in relation to the pane in front of the wedge tip 38 of the light coupling-in elements 12, for example, by means of an adhesive bond 53, and at its outer edge 54 in a groove 55 in the edge foam 42, for example by means of clamping engagement.

Figure 14:
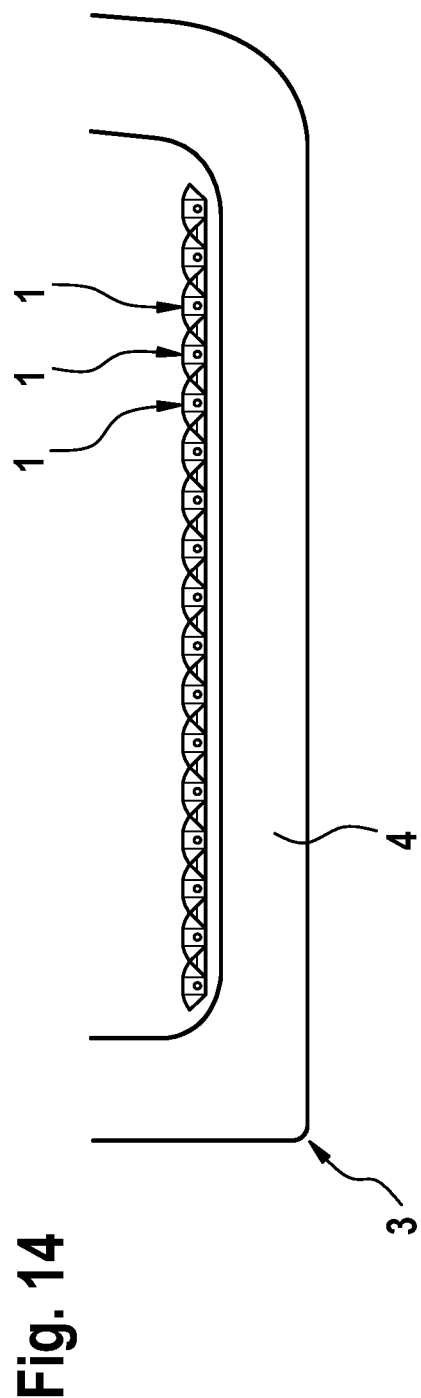
FIG. 14 shows a top view of the underside of a lateral edge portion of the vehicle pane with a row of molded-on light coupling-in elements.
Figure 15:
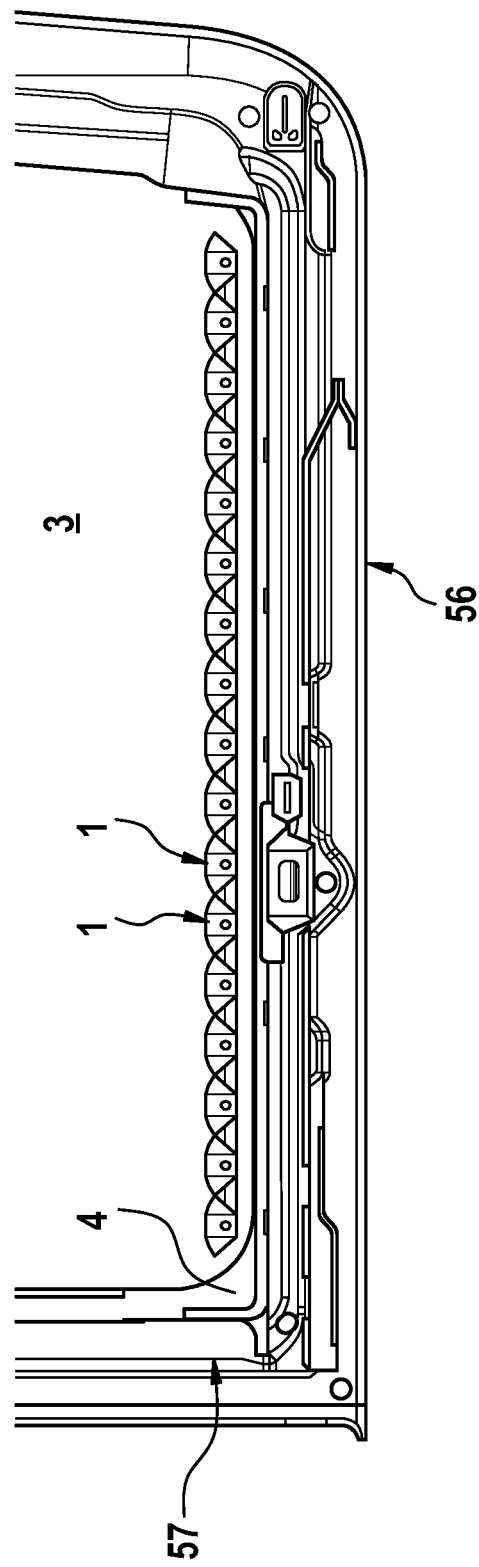
FIG. 15 shows a top view of the underside of a lateral edge portion of a lid, which includes the vehicle pane of FIG. 14.

FIG. 14 shows the vehicle pane 3 with a row of light coupling-in elements 12, which are foamed onto the pane inner side in the longitudinal direction or in the x-direction inwardly of the edge foam 42, which is formed, for example, by a black-colored polyurethane. FIG. 15 shows the underside of a lid 56 of a vehicle roof with a lid frame 57, which is connected to the vehicle pane 3.

The light coupling-in elements 12 are preferably formed from a transparent polyurethane. The foam material of the light coupling-in elements 12 and the material of the light guide layer 10 expediently have the same or similar optical properties. Preferably, PU-based foam materials, which have a high transparency, little yellowing due to aging, and a refractive index adapted to the light guide layer 10, are suitable. For example, a refractive index of about 1.5 for thermoplastic polyurethane (TPU) is very similar to the refractive index of glass used for the light guide layer 10.

The invention claimed is:

1. A vehicle pane having a light guide layer on the pane inner side and having a lighting device, which inputs light into the light guide layer by a light coupling-in device, wherein the lighting device has at least two LEDs and in that each LED is assigned a respective light coupling-in element, via which light from the respective LED is input into the light guide layer, wherein the multiple LEDs and the respectively assigned light coupling-in elements are arranged side by side in a row,
   wherein each light coupling-in element has a base surface and is optically connected, via its base surface, to an inner surface of the light guide layer facing a vehicle interior; and
   wherein each of a wedge-shaped or a prismatic light coupling-in element at edges of the base surface has mutually opposite inclined side edges, which converge toward an LED surface.

2. The vehicle pane as claimed in claim 1, wherein the light coupling-in elements are attached as independent components to the light guide layer, by adhesive bonding, by potting material, by adhesive tape or by a holding or clamping device, or are foamed and/or injected onto the light guide layer, or are formed in one piece with the light guide layer.

3. The vehicle pane as claimed in claim 1, wherein each light coupling-in element has an LED surface facing an adjacent pane edge and the respective LED is positioned on the LED surface.

4. The vehicle pane as claimed in claim 1, wherein each wedge-shaped or prismatic light coupling-in element at each inclined side edge has an inclined reflection surface which starts from the inclined side edge and is arranged perpendicular to the base surface, or an inclined side reflection surface which starts from the inclined side edge and is arranged at an acute angle to the base surface.

5. The vehicle pane as claimed in claim 1, wherein characterized in that the LEDs are attached to a carrier and the light coupling-in elements are positioned on and attached to the carrier assigned to the respective LED.

6. The vehicle pane as claimed in claim 5, wherein a lighting module comprising the carrier with the LEDs and the light coupling-in elements is attached to the light guide layer by the light coupling-in elements.

7. The vehicle pane as claimed in claim 5, wherein each light coupling-in element has at least one attachment element for being mounted on the carrier.

8. The vehicle pane as claimed in claim 5, wherein a cover is connected to the carrier.

9. The vehicle pane as claimed in claim 8, wherein the cover is held at or attached to the light guide layer and holds the carrier with the light coupling-in elements in position at the light guide layer, or in that the cover is attached to a carrier and is held in position by the carrier at the light guide layer, wherein the carrier is attached to the light guide layer by means of the light coupling-in elements.

10. The vehicle pane as claimed in claim 1, wherein the light coupling-in elements hold a carrier substantially perpendicular to the inner surface of the light guide layer and in that the LEDs radiate light emitted from their top sides via the LED surfaces into the light coupling-in elements.

11. The vehicle pane as claimed in claim 1, wherein each foamed-on, injected, adhesively bonded light coupling-in element or light coupling-in element formed in one piece with the light guide layer has a holder and the holders position a carrier carrying the LEDs at the light coupling-in elements.

12. A method for producing a vehicle pane with a lighting device as claimed in claim 1, comprising the steps of: attaching a carrier with LEDs, fixedly connecting the light coupling-in elements the carrier in each case assigned to one of the LEDs, and attaching a lighting module comprising the carrier with the LEDs and the light coupling-in elements to the light guide layer with optical coupling of the light coupling-in elements to the light guide layer, by way of attaching the light coupling-in elements to the light guide layer, or connecting a cover which is connected to the carrier and covers the lighting module being attached to the light guide layer, thus positioning and fixing the carrier.

13. A method for producing a vehicle pane with a lighting device as claimed in claim 1, comprising the steps of: forming the light guide layer with light coupling-in elements which are molded on in one piece, or foaming the light coupling-in elements onto the light guide layer, providing the light coupling-in elements with holders for a carrier carrying the LEDs, and attaching in that the carrier is attached to the holders, wherein the LEDs are positioned at the light coupling-in elements.

14. A vehicle pane having a light guide layer on the pane inner side and having a lighting device, which inputs light into the light guide layer by a light coupling-in device, wherein the lighting device has at least two LEDs and in that each LED is assigned a light coupling-in element, via which light from the respective LED is input into the light guide layer,
   wherein the light coupling-in elements hold a carrier substantially parallel to the inner surface of the light guide layer and in that the LEDs radiate light emitted from their sides via LED surfaces into the light coupling-in elements.

15. A vehicle pane having a light guide layer on the pane inner side and having a lighting device, which inputs light into the light guide layer by a light coupling-in device, wherein the lighting device has at least two LEDs and in that each LED is assigned a light coupling-in element, via which light from the respective LED is input into the light guide layer,
   wherein the LEDs are arranged between a carrier and the light guide layer and adjacent to the light guide layer or directly on the light guide layer.

* * * * *